United States Patent
Huang

(10) Patent No.: US 8,122,184 B2
(45) Date of Patent: Feb. 21, 2012

(54) METHODS FOR MANAGING BLOCKS IN FLASH MEMORIES

(75) Inventor: He Huang, Shenzhen (CN)

(73) Assignee: Memoright Memoritech (Wuhan) Co., Ltd., Wuhan (CN)

( * ) Notice: Subject to any disclaimer, the term of this patent is extended or adjusted under 35 U.S.C. 154(b) by 393 days.

(21) Appl. No.: 12/497,368

(22) Filed: Jul. 2, 2009

(65) Prior Publication Data
US 2009/0271567 A1    Oct. 29, 2009

Related U.S. Application Data

(63) Continuation of application No. PCT/CN2007/071335, filed on Dec. 26, 2007.

(30) Foreign Application Priority Data

Jan. 17, 2007  (CN) .......................... 2007 1 0072980

(51) Int. Cl.
*G06F 12/10* (2006.01)
*G06F 12/16* (2006.01)

(52) U.S. Cl. ......... 711/103; 711/165; 711/203; 711/206

(58) Field of Classification Search .................. 711/103, 711/202, 165
See application file for complete search history.

(56) References Cited

U.S. PATENT DOCUMENTS

| | | | |
|---|---|---|---|
| 5,544,312 A * | 8/1996 | Hasbun et al. ................... 714/42 |
| 6,427,186 B1 * | 7/2002 | Lin et al. ........................ 711/103 |
| 7,206,893 B2 * | 4/2007 | Gan et al. ....................... 711/103 |
| 7,797,481 B2 * | 9/2010 | Lee et al. ....................... 711/103 |
| 2004/0083335 A1 * | 4/2004 | Gonzalez et al. .............. 711/103 |
| 2008/0091872 A1 * | 4/2008 | Bennett et al. ................. 711/103 |
| 2009/0094409 A1 * | 4/2009 | Yeh et al. ....................... 711/103 |
| 2009/0259819 A1 * | 10/2009 | Chen et al. ..................... 711/165 |
| 2010/0205354 A1 * | 8/2010 | Suzuki .......................... 711/103 |

FOREIGN PATENT DOCUMENTS

| | | |
|---|---|---|
| CN | 100356347 C | 12/2007 |
| CN | 100377119 C | 3/2008 |
| CN | 100504814 C | 6/2009 |
| TW | I253564 | 4/2006 |
| TW | I267866 | 12/2006 |
| WO | 2004001605 A1 | 12/2003 |

\* cited by examiner

*Primary Examiner* — John Lane
(74) *Attorney, Agent, or Firm* — Seed IP Law Group PLLC

(57) ABSTRACT

A method for managing blocks in a flash memory is provided, which includes dynamic and static block managing methods. In the dynamic block managing method, a blank block is selected as a swap block for write operation. During each write operation, new data and/or original data in an object block to be operated are written into the swap block, and the object block is erased. Then, a logical address of the object block is changed to be a logical address of the swap block, so that the object block served as the swap block for a next write operation. In the static block managing method, a variable seed parameter is set. Different values of the seed parameter are each associated with a logical address of a respective flash memory block. When the value of the seed parameter varies, data in the flash memory block and the swap block associated to the value of the seed parameter are exchanged, so that the flash memory block associated to the value of the seed parameter becomes the swap block for the next write operation.

13 Claims, 4 Drawing Sheets

METHODS FOR MANAGING BLOCKS IN FLASH MEMORIES

TECHNICAL FIELD

The present application refers to semiconductor memories, in particular, to methods for managing blocks in a flash memory to make the blocks worn evenly.

BACKGROUND

Flash memories have been widely used in various fields, since such memories have high density, large memory capacity, comparatively less time consumption for read/write operations, and nonvolatile ability. However, flash memories have been limited in application due to inherent defects thereof. In one aspect, some special operations are induced due to special write and block erase operations of the flash memory. Generally, in the write operation of a flash memory, original data in an object block to be operated are fetched into a RAM (Random Access Memory) and the object block is then erased. Since data writing into a flash memory block is implemented in page units sequentially, original data in preceding pages are written into the erased object block firstly. Then, new data and the original data in posterior pages are written into the object block. At last, block managing information is updated. During such a complicated process, unrecoverable errors may occur. For example, in case the power is down during the erase operation on the object block, if data writing is not completed in the operated object block and the information in a mapping table is not updated, the old data will become invalid. In another aspect, a flash memory usually has a lifetime determined by its own storage principle. Generally, floating grids of storage units in a flash memory are discharged (i.e., erase) to a general state at first, and then charged (i.e., program) to a required state for storing data. During the repeated erase and program operations, more and more electrons are captured by the floating grids due to a tunnel effect. When the captured electrons come up to a certain amount, a larger voltage is required to charge the floating grids. In this situation, the lifetime of the flash memory expires. A NOR type flash memory is generally able to be erased or reprogrammed for about 10,000 times. A NAND type flash memory is generally able to be erased or reprogrammed for about 100,000 times.

The above-mentioned numerical values are only average values in theory. In practice, the lifetime of a flash memory is far less than the theoretical value. This is mainly because the operating frequencies of various blocks are different. Some blocks are erased or reprogrammed more frequently and become bad blocks very soon. When a certain number of bad blocks are contained in a flash memory, the flash memory is unusable and its lifetime expires. Meanwhile, some other blocks are used less frequently, or even seldom used until the flash memory is out of work, which is quite wasteful. At present, many flash memory manufacturers reserve some space in flash memory chips for replacing the bad blocks to prolong the lifetime of the flash memory. However, blocks in the flash memory still cannot be used sufficiently and a lot of flash memory resources are wasted.

A Chinese Patent Application "A Method for Protecting Data in a Flash Memory Medium" (Publication No. CN1567256 A) discloses a method for writing data in a flash memory medium. During each write operation, a blank block is selected as a storing block for the current write operation. Original data in an object block and new data are written into the storing block. Information on correlation between a logical address of the object block and that of the storing block is recorded in an address mapping table in the flash memory medium. During operations, an original block and a new block are addressed according to the information recorded in the address mapping table. The method is mainly directed to protect data written into the flash memory medium before an illegal power failure during the data writing. However, it is complicated to be implemented, since much more time is required in each of write operations to find a blank block to be written. Besides, too many redundant information regions in the blocks are occupied to record information such as mapping addresses to ensure the data security. In addition, according to the method, blank blocks with preceding addresses are used more frequently, causing the using frequencies of blocks to be uneven, so that the lifetime of the flash memory expires earlier.

SUMMARY

The present application is directed to methods for managing blocks in a flash memory. According to the methods, the flash memory device may be worn evenly in order to extend the overall lifetime of the flash memory. In addition, operation speed and data security of the flash memory may be improved.

To do this, the following technical solutions are provided.

In one aspect of the application, a method for managing blocks in a flash memory is provided, the flash memory comprising one or more flash memory chips, each of the flash memory chips comprises a plurality of blocks, each of the blocks comprises a plurality of pages, each of the pages includes a data storage region and a redundant region, the method comprises: selecting one or more blocks from the plurality of blocks as a reserved area for an address mapping table which records logical addresses and physical addresses of the blocks, the address mapping table is stored in the reserved area per pages; selecting at least one blank block as a swap block and establishing a swap block address mapping table item comprising a logical address and a physical address of the swap block in the redundant region of the page storing the address mapping table; and during a write operation, writing new data and/or original data contained in an object block to be operated into the swap block according to the logical address of the swap block, erasing the object block, and changing the logical address of the object block to the logical address of the swap block so that the object block serves as the swap block for a next write operation.

In an implementation, the write operation comprises:
1) reading information from the address mapping table and the address mapping item of the reserved area;
2) determining whether a latest operation is completed normally according to information of the address mapping table and the address mapping item;
3) entering an exception process if the latest operation is not completed normally; otherwise, entering a step of data write operation;
4) during the data write operation, first writing original data in preceding pages of the object block into the swap block, then writing the new data for the current write operation into the swap block, and writing remaining original data of the object block into the swap block;
5) erasing the object block;
6) updating the address mapping table and the address mapping table item by exchanging the physical address corresponding to the logical address of the swap block with the physical address corresponding to the logical address of the object block; and 7) storing the updated mapping table and address mapping table item of the swap block into a next page of the reserved area and a redundant region of the next page, respectively.

Furthermore, after each updating, the updated address mapping table and the updated address mapping item for each updating are stored in a page in the reserved area circularly according to a predetermined rule as the number of the updating increases.

In another implementation, the predetermined rule comprises storing the updated mapping table and the updated address mapping item in a page next to the page currently used in the reserved area, and circularly storing the updated mapping table and the updated address mapping item from a first page to a last page of the reserved area as the number of the updating increases.

The exception process may comprise determining whether a power-down occurs when the data is being written into the swap block, if it is the case, erasing the swap block in which the data are partially written; determining whether a power-down occurs when the object block is being erased, if it is the case, copying the data from the swap block into the object block and erasing the swap block; and determining whether a power-down occurs when the address mapping table is being updated, if it is the case, locating the object block and the swap block for the latest operation according to the information of the address mapping table and address mapping table item, copying the data from the swap block into the object block and erasing the swap block.

In another aspect of the application, a method for managing blocks in a flash memory statically is provided, the flash memory comprising one or more flash memory chips, each of the flash memory chips comprises a plurality of blocks, each of the blocks comprises a plurality of pages, each of the pages includes a data storage region and a redundant region, the method comprises: selecting one or more blocks from the plurality of blocks as a reserved area for an address mapping table which records logical addresses and physical addresses of the blocks, the address mapping table is stored in the reserved area per pages; selecting at least one blank block as a swap block and establishing a swap block address mapping table item comprising a logical address and a physical address of the swap block in a redundant region of the page storing the address mapping table; establishing a variable seed parameter, wherein different values of the seed parameter are each associated with a logical address of a respective block; when the value of the seed parameter varies, writing data stored in a respective block associated with the value of the seed parameter into the swap block according to information of the address mapping table, erasing the associated block, and changing the logical address of the associated block to the logical address of the swap block so that the associated block serves as the swap block for a next write operation; and during a write operation, writing new data and/or original data contained in an object block to be operated into the swap block according to the logical address of the swap block, erasing the object block, and changing the logical address of the object block to the logical address of the swap block so that the object block serves as the swap block for a next write operation.

In an implementation, the value of the seed parameter is stored into the redundant region of the page storing the address mapping table while updating the address mapping table.

In another implementation, a circulation parameter N is set. The value of the seed parameter is increased by 1 for every N circulations, wherein one circulation refers to a position of the page storing the address mapping table returns back to a position of the first page in the reserved area.

The value of the seed parameter is used for determining the worn degree of the flash memory.

The present application has the following advantages.

According to the block managing method of the present application, a reserved area in the flash memory is assigned for storing an address mapping table comprising logical addresses and physical addresses of blocks, and an address mapping table item is established in a redundant region in the page storing the mapping table. When a write operation is performed, data are written in the swap block according to information recorded in the mapping table. The object block is erased and the logical address of the object block is changed to be the logical address of the swap block so that the object block can serve as the swap block for a next write operation. In this block managing method, various physical addresses may be associated with logical addresses separately. Although logical addresses of the flash memory are called unevenly during operations of a file system of a host, the mapping between logical addresses to physical addresses is disturbed. Such an address mapping is dynamic, so that operations may be evenly allocated to physical blocks involved in the management to prolong the lifetime of the flash memory effectively.

Furthermore, a seed parameter may be set. The logical block corresponding to the value of the seed parameter may be enforced to join in the dynamic block management. As the value of the seed parameter increases, all blocks are enforced to join in the wear leveling process evenly so that it is possible to avoid the appearance of a dead block which is never involved in the wear leveling.

According to the present application, only one swap block is maintained dynamically in a flash memory chip, and an individual region is assigned for storing the mapping addresses of the swap block, so that the time required for locating the swap block can be reduced effectively. Meanwhile, it is not needed to occupy more redundant regions from the data region to record information of the swap block. Therefore, operation time and space may be saved effectively.

In the write operation of the present application, parts of original data in the object block are written into the swap block at first. Then, new data are written into the swap block. After that, the remaining original data are written into the swap block. The object block is erased. The erase operation is performed at the end of the whole process. As a result, data may be retrieved even if an exception occurs, since the effective data and a clue for retrieving the data are maintained.

DETAILED DESCRIPTION

Hereinafter, a detailed description of the present application will be given with reference to the appended drawings and embodiments.

Generally, a flash memory device mainly comprises an interface, an interface controller, a flash memory controller and a flash memory chip array. The interface controller typically comprises a micro control unit (MCU) and a firmware. Operating commands from a host application are received by the flash memory device via the interface. Then, the operating commands are transferred to the interface controller through the interface. The commands from the host are interpreted into underlying operating commands by the firmware and the MCU of the interface controller. The underlying operating commands are then transmitted to the flash memory controller, and interpreted by the flash memory controller into control signals for controlling operations on the chip array. A method for managing blocks of the flash memory is performed by the firmware when the host commands are interpreted into the underlying operation commands by the same.

Before managing the flash memory, storage area of the flash memory needs to be partitioned. The flash memory chip array generally comprises a plurality of flash memory chips that may be arranged in rows and channels Each chip is read and/or written in page units. In an embodiment according to the present application, each page comprises a valid data region of 2048 bytes and a redundant information region of 64 bytes. Every 64 pages constitute a block. The number of blocks in a flash memory chip depends on the memory capacity of the chip. In this specification, a flash memory chip having a memory space equal to or less than 64 Mbytes is demonstrated. Moreover, as for a chip with a memory space larger than 64 Mbytes, it is possible to assign a reserved area for an address mapping table to every 64 Mbytes of the chip, so that the operations on such a chip is similar to the chip having a memory space no more than 64 Mbytes.

Figure 5:
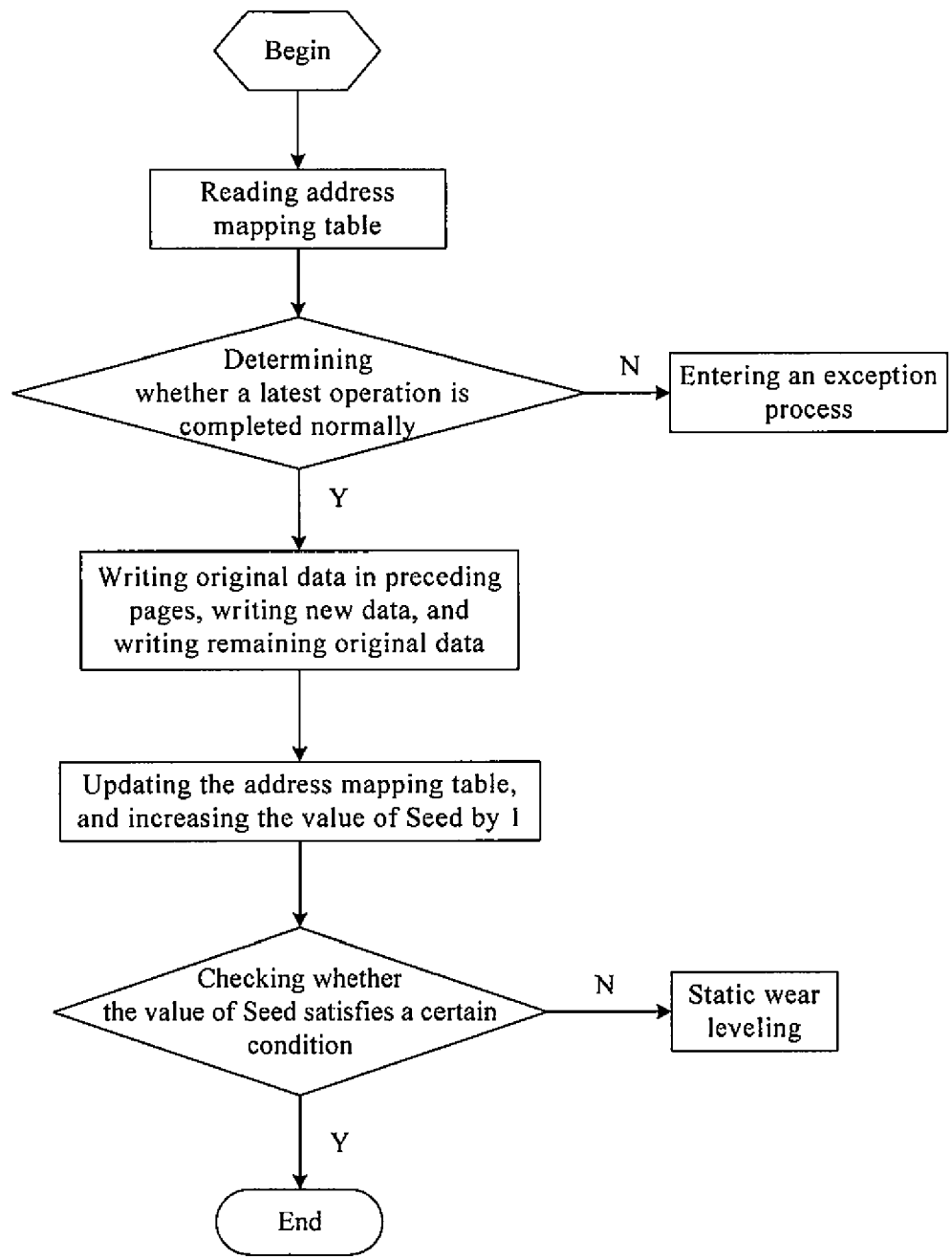
FIG. 5 is a flow chart of the block management method of the present application.

The block managing method according to the present application is directed to the following three aspects. At first, the number of the erase or reprogram operations of the flash memory is decreased, so that worn degree of the flash memory is lower. Secondly, the erase or reprogram operations on a chip are distributed evenly among all blocks to make the blocks to be operated with an identical probability. Thirdly, a secure block managing method and system strategy is provided to ensure the safety of the data stored in the flash memory. The above three aspects can be implemented in the present application. In embodiments, a dynamic wear leveling method and a static wear leveling method are provided. FIG. 5 shows a flow chart of an example according to the present application. As shown in FIG. 5, the dynamic wear leveling method and the static wear leveling method for managing the blocks of the flash memory are included. Hereinafter, the application is described in conjunction with two embodiments.

Embodiment 1

According to the embodiment, an address mapping table is established and stored in a reserved area of flash memory chips. The address mapping table is provided to maintain the mapping relationship between logical addresses of blocks of the flash memory in a file system and physical addresses of the blocks. The size of the reserved area is relevant to the lifetime designed for the data region of the chip. The address mapping table can be updated and the updated address mapping table is stored in a page. The mapping relationship is then initialized. A blank block in the data region is selected as a swap block. Meanwhile, an address mapping table item for the swap block is established individually and is stored in a redundant region of the page which stores the address mapping table for data blocks in a mapping area.

Figure 1:
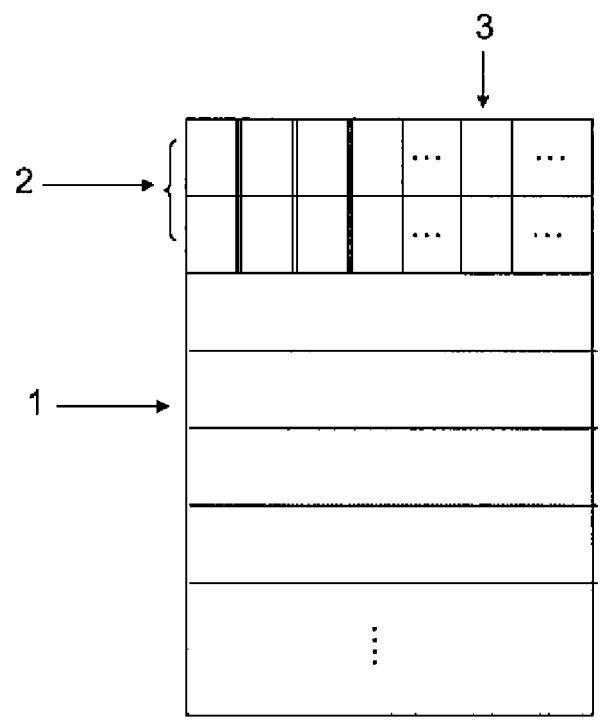
FIG. 1 is a schematic view of division of a flash memory chip according to the present application.
Figure 2:
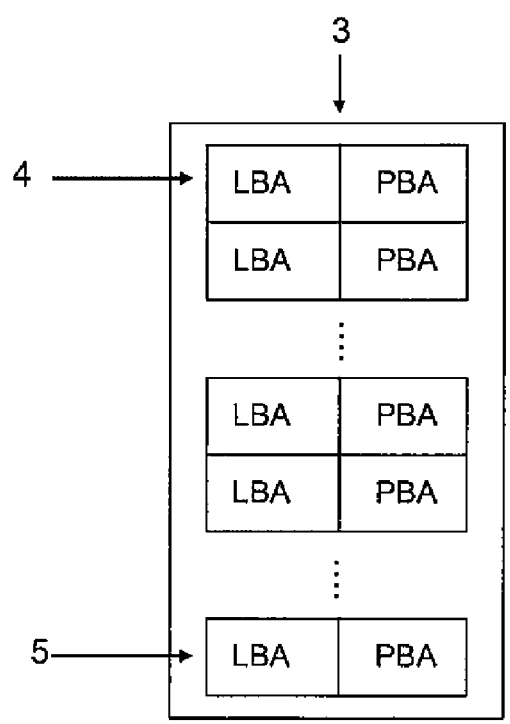
FIG. 2 is an enlarged view of the page 3 in FIG. 1.

A flash chip is shown in FIG. 1. The flash memory chip is divided into a plurality of blocks. A certain number of blocks are selected as reserved blocks for the mapping table region. The number of the selected blocks depends on the lifetime designed for the storing device. The lifetime of the mapping table region must be longer than that of the data region. FIG. 2 illustrates a division of the reserved blocks for the mapping table, wherein two blocks are selected as the reserved blocks. Each block includes 64 pages. As shown in FIG. 2, after each operation, the mapping table for recording the relationship between logical block addresses (LBA) and physical block addresses (PBA) of the chip is stored in a page. As shown in FIG. 1, the reference number 3 refers to an operating page of the reserved blocks for the current mapping table. FIG. 2 is an enlarged view of the operating page, which records main information of the mapping table. In FIG. 2, the reference number 4 refers to a mapping relationship between the logical address and the physical address for any one of the blocks in the chip and the reference number 5 refers to a mapping table for the swap block stored in the redundant region of the chip.

The dynamic wear leveling process according to the embodiment comprises the following steps. At first, during the write operation of the flash memory chip, original data stored in the pages of the object block to be operated preceding a page to be operated of the object block will be written into the swap block; then, current operation data are written into the swap block, and remaining original data are written into the swap block; after that, the object block is erased. Next, the logical address of the object block is changed to be the logical address of the swap block so that the object block becomes the swap block for the next write operation. In particular, this change may be implemented by exchanging the physical address corresponding to the logical address of the object block with the physical address corresponding to the logical address of the swap block. The data block address mapping table and the swap block address mapping table are updated and stored in the mapping table region and the redundant mapping table region of a flash memory chip.

Figure 3:
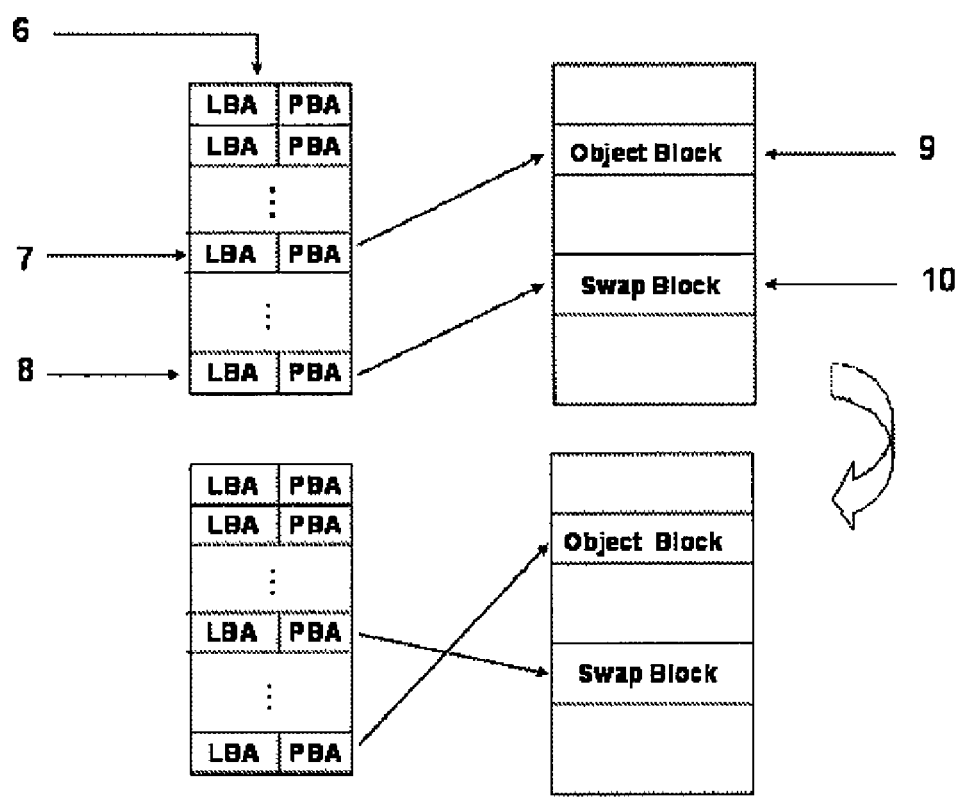
FIG. 3 is a schematic view of the dynamic wear leveling according to an embodiment of the block management method of the present application.

FIG. 3 illustrates a dynamic wear leveling management method. As shown in FIG. 3, during the current operation, a page storing mapping information is denoted as "6". Correspondence between the logical and physical addresses of the swap block stored in the redundant region of the current mapping table is denoted as "8". Correspondence between the logical and physical addresses of the current operated object block is denoted as "7". Actual positions in the chip corresponding to the physical address of the current operated object block and the swap block are denoted as "9" and "10", respectively. When a write operation is performed, the firmware read out the information of the mapping table and of the swap block recorded in the reserved area in the chip. Based on the page sequence of the block, preceding original data in a current operated object block are extracted and written into a corresponding position of the swap block according to the correspondence between the logical and physical addresses recorded in the mapping table. Then, the current operation data are written into the swap block. After that, remaining original data in the current operated block are written into the swap block. The object block is then erased and the logical address of the object block is changed into the logical address of the swap block so that the object block can serve as the swap block for the next write operation. When the above operations are completed, the updated mapping table item is stored into the next physical page in the reserved area before the power is down. During the dynamic wear leveling process, in order to prevent the reserved area from damage earlier due to repeated operations, a plurality of blocks are assigned for the reserved area for storing the address mapping table, which can be circularly chosen to store the address mapping table according to the order of the physical addresses thereof. According to the dynamic wear leveling process, it is possible to ensure that blocks may be operated evenly.

According to the present application, during the write operation, the erase operation is performed as the last step of the whole process. Therefore, data may be retrieved even if an exception occurred, since the effective data and a clue for providing the data are preserved.

Exception 1: If the power is down while the data are writing into the swap block, the mapping table has not been updated since the write operation is not completed. When the flash memory device is powered up again, the original data can be retrieved according to the mapping table. The device may return to the original state prior to the write operation by just erasing the swap block recorded in the mapping table.

Exception 2: If the power is down while the erase operation of the object block is performed after all the data have been written into the swap block while the mapping table has not been updated, the original data in the object block are deleted partially due to the exception, and the swap block is not empty since the date write operation is completed. According to this condition, the firmware may erase the object block, copy the data stored in the swap block into the object block and erase the swap block then.

Exception 3: If the power is down while updating the mapping table, the object block and the swap block for the preceding operation can be determined according to records in the mapping table and information of the swap block recorded in the redundant region of the mapping table. In this case, the object block is empty and the swap block is a normal data block which is not empty. According to the above condition, the firmware may copy the data stored in the swap block into the object block, erase the swap block, and then write the updated mapping table into the redundant region.

Embodiment 2

Although most blocks can be operated with a same probability by the dynamic wear leveling process, there still may be some dead blocks. The term "dead block" refers to a block which is never operated and not involved in the dynamic wear leveling process. In this case, a static wear leveling process is provided. According to the present application, the address mapping table is sequentially stored in page units in blocks in the reserved area for mapping tables. When all pages in a block have been written, a next block is used according to the sequence of the physical addresses thereof. After all blocks in the mapping table area have been used, a position in the beginning of the reserved area will be re-used. In this embodiment, one circulation for the use of the reserved area for the mapping table requires 64 times of the write operations on the blocks. In the static wear leveling process, a seed parameter is established whose value is maintained as follows. The value of the seed parameter is increased by 1 after each circulation of the mapping table area. Alternatively, a circulation parameter N may be set and the value of the seed parameter is increased by 1 after every N circulations. The value of the seed parameter is stored in the redundant area of the mapping table once the mapping table is updated. When the value of the seed parameter varies, data in a physical block corresponding to the logical address equal to the value of the seed parameter are enforced to be copied into the swap block to perform a dynamic wear leveling on the swap block and the logical block corresponding to the value of the seed parameter. After that, the erase operation and store operation are performed. According to the static wear leveling process, one logical block is enforced to join in the dynamic wear leveling. When there is a dead block, i.e., a block never operated, the block will join in the wear leveling management as the value of the seed parameter increases. Once the block joins in, operations will be assigned to it evenly.

Figure 4:
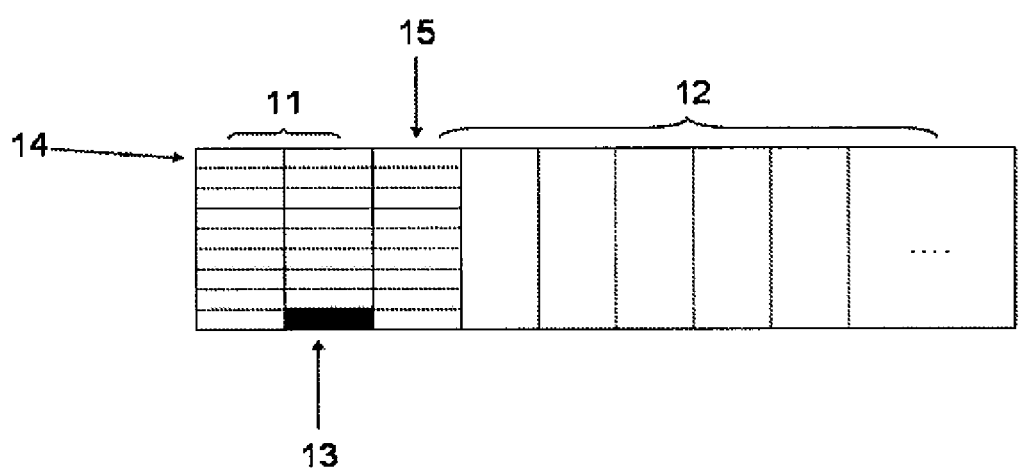
FIG. 4 is a schematic view of the static wear leveling according to another embodiment of the block management method of the present application.

In this embodiment, the method of dynamic wear leveling block management and the exception process as described in embodiment 1, and the method of static wear leveling block management as described in embodiment 2 are included. As shown in FIG. 4, in the present embodiment, two blocks are pre-selected as the reserved blocks 11 of the mapping table of the flash memory chip. Remaining blocks 12 are configured as the data region. In a current operation, the mapping table is stored in a physical page 13. When the current operation is completed, normally, the firmware will add 1 to the physical address of the page 13 and store the updated address in the reserved block. That is, the updated mapping table should be written into the page 15. Therefore, in the present embodiment, the firmware will store the updated mapping table in a beginning position 14 circularly. In the meantime, after such a circulation, or alternatively, after every N times of such circulations if a circulation parameter N is set, the value of the seed parameter maintained by the firmware is increased by 1 so as to record the times of the circulation or circulation parameter N. Every time the value of the seed parameter is increased by 1, the firmware initiates an enforced operation to write the data stored in the physical address corresponding to the logical address equal to the value of the seed parameter into the swap. Then, an object block corresponding to the value of the seed parameter is erased and the logical address thereof is changed to be the logical address of the swap block so that the object block will serve as the swap block for the next write operation. In particular, the physical address of the swap block and the physical address corresponding to the logical address equal to the value of the seed parameter are exchanged with each other. The address mapping table for the data blocks is then stored in a next physical page and the address mapping table item for the swap block is stored in the redundant region of the page. According to the above process, all blocks will be enforced to join in the wear leveling process gradually so as to avoid the appearance of the dead blocks which do not involve in the operations.

The present application is described with reference to the above embodiments in detail. However, the application is not limited by the embodiments. It is obvious for those skilled in the art that modifications and variations can be made without departing from the spirit of the application, which are all within the scope of the application defined by the claims.

The invention claimed is:

1. A method for managing blocks in a flash memory, the flash memory comprising one or more flash memory chips, each of the flash memory chips comprising a plurality of blocks, each of the blocks comprising a plurality of pages, each of the pages including a data storage region and a redundant region, the method comprising:

selecting one or more blocks from the plurality of blocks as a reserved area for an address mapping table which records logical addresses and physical addresses of the blocks, the address mapping table being stored in the reserved area per pages;

selecting at least one blank block as a swap block and establishing a swap block address mapping table item comprising a logical address and a physical address of the swap block in the redundant region of the page storing the address mapping table; and during a write operation, writing new data and/or original data contained in an object block to be operated into the swap block according to the logical address of the swap block, erasing the object block, and changing the logical address of the object block to the logical address of the swap block so that the object block serves as the swap block for a next write operation.

2. The method of claim 1, wherein the write operation comprises:
1) reading information from the address mapping table and the address mapping item of the reserved area;
2) determining whether a latest operation is completed normally according to the information of the address mapping table and the address mapping item;
3) entering an exception process if the latest operation is not completed normally; otherwise, entering a step of data write operation;
4) during the data write operation, first writing original data in preceding pages of the object block into the swap block, then writing the new data for the current write operation into the swap block, and writing remaining original data of the object block into the swap block;
5) erasing the object block;
6) updating the address mapping table and the address mapping table item by exchanging the physical address corresponding to the logical address of the swap block with the physical address corresponding to the logical address of the object block; and
7) storing the updated mapping table and the updated address mapping table item into a next page of the reserved area and a redundant region of the next page, respectively.

3. The method of claim 1, wherein the updated address mapping table and the updated address mapping item for each updating are stored in a page of the reserved area circularly according to a predetermined rule as the number of the updating increases.

4. The method of claim 3, wherein the predetermined rule comprises storing the updated mapping table and the updated address mapping item in a page next to the page currently used in the reserved area, and circularly storing the updated mapping table and the updated address mapping item from a first page to a last page of the reserved area as the number of the updating increases.

5. The method of claim 2, wherein the updated address mapping table and the updated address mapping item for each updating are stored in a page of the reserved area circularly according to a predetermined rule as the number of the updating increases.

6. The method of claim 5, wherein the predetermined rule comprises storing the updated mapping table and the updated address mapping item in a page next to the page currently used in the reserved area, and circularly storing the updated mapping table and the updated address mapping item from a first page to a last page of the reserved area as the number of the updating increases.

7. The method of claim 2, wherein the exception process comprises:
determining whether a power-down occurs when the data is being written into the swap block, if it is the case, erasing the swap block in which the data are partially written;
determining whether a power-down occurs when the object block is being erased, if it is the case, copying the data from the swap block into the object block and erasing the swap block; and
determining whether a power-down occurs when the address mapping table is being updated, if it is the case, locating the object block and the swap block for the latest operation according to the information of the address mapping table and the address mapping table item, copying data from the swap block into the object block and erasing the swap block.

8. A method for managing blocks in a flash memory, the flash memory comprising one or more flash memory chips, each of the flash memory chips comprising a plurality of blocks, each of the blocks comprising a plurality of pages, each of the pages including a data storage region and a redundant region, characterized in that, the method comprises:
selecting one or more blocks from the plurality of blocks as a reserved area for an address mapping table which records logical addresses and physical addresses of the blocks, the address mapping table being stored in the reserved area per pages;
selecting at least one blank block as a swap block and establishing an swap block address mapping table item comprising a logical address and a physical address of the swap block in a redundant region of the page storing the address mapping table;
establishing a variable seed parameter, wherein different values of the seed parameter are each associated with a logical address of a respective block;
when the value of the seed parameter varies, writing data stored in a respective block associated with the value of the seed parameter into the swap block according to information of the address mapping table, erasing the associated block, and changing the logical address of the respective block to the logical address of the swap block so that the associated block serves as the swap block for a next write operation; and
during a write operation, writing new data and/or original data contained in an object block to be operated into the swap block according to the logical address of the swap block, erasing the object block, and changing the logical address of the object block to the logical address of the swap block so that the object block serves as the swap block for a next write operation.

9. The method of claim 8, wherein the value of the seed parameter is stored into the redundant region of the page storing the address mapping table while updating the address mapping table.

10. The method of claim 8, wherein a circulation parameter N is set, and the value of the seed parameter is increased by 1 for every N circulations, wherein one circulation refers to a position of the page for storing the address mapping table returns back to a position of the first page in the reserved area.

11. The method of claim 9, wherein a circulation parameter N is set, and the value of the seed parameter is increased by 1 for every N circulations, wherein one circulation refers to a position of the page for storing the address mapping table returns back to a position of the first page in the reserved area.

12. The method of claim 8, wherein the value of the seed parameter is used to determine the worn degree of the flash memory.

13. The method of claim 9, wherein the value of the seed parameter is used to determine the worn degree of the flash memory.

* * * * *